July 20, 1965   F. A. KORECKY ETAL   3,195,863
TOOL GUARD
Filed Sept. 30, 1963
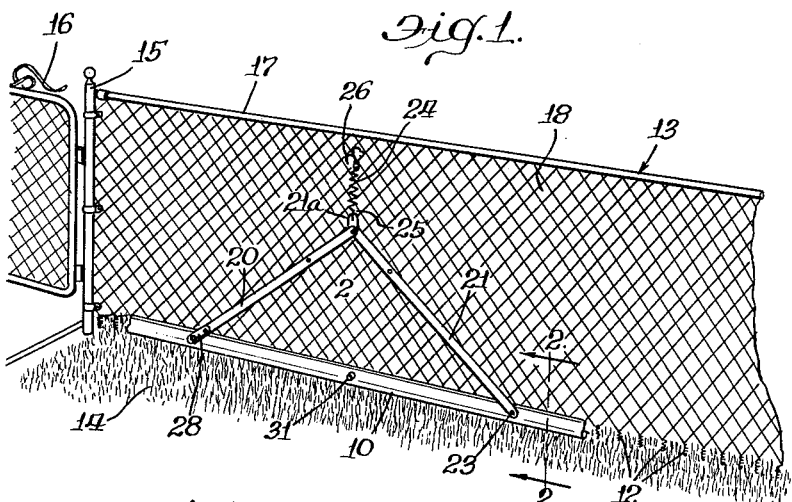
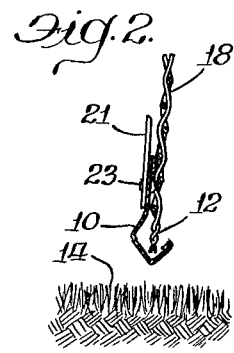
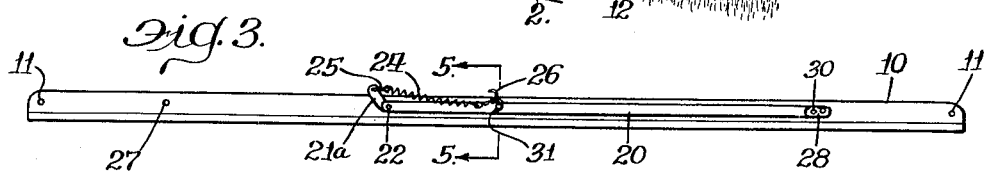
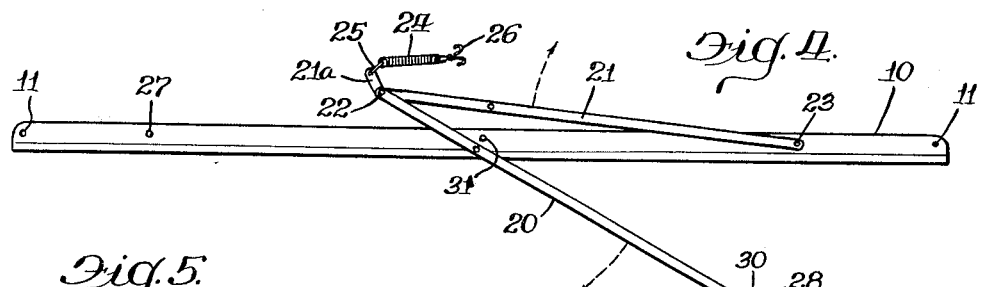
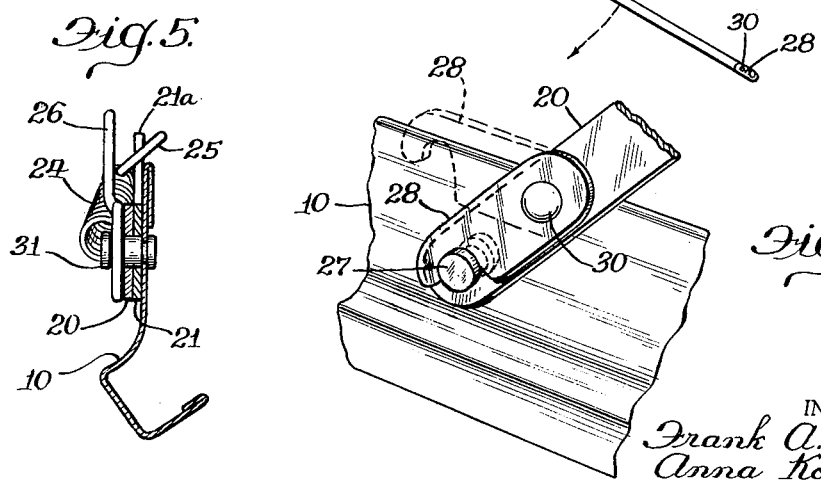
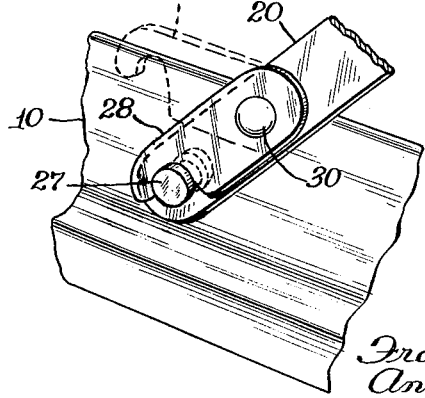
INVENTORS.
Frank A. Korecky
Anna Korecky
By: Snow and Benno
Attys.

United States Patent Office 3,195,863
Patented July 20, 1965

3,195,863
TOOL GUARD
Frank A. Korecky and Anna Korecky, both of
229 Anderson Terrace S., Des Plaines, Ill.
Filed Sept. 30, 1963, Ser. No. 312,648
8 Claims. (Cl. 256—1)

This invention relates generally to tool guards, and more particularly to a guard which is applied to the lower edge of a fence such as a chain-link fence to prevent damage to a grass or plant cutting tool having at least one horizontally movable blade.

The primary object of the invention is to provide a novel tool guard construction which may easily be applied to the depending edge of a fence to protect a grass or plant cutting tool from being damaged by accidental cutting engagement with the lower depending edge of the fence.

It is a further object to provide a novel tool guard construction according to the preceding paragraph in which the guard spans a substantial length of fence and in which the guard is easily repeatedly moved and repositioned along a fence.

It is a further object to provide a novel tool guard construction according to the preceding paragraph in which the guard is easily manually foldable into a compact package for convenient storing thereof.

It is still another object to provide a novel tool guard construction for preventing damage to a tool used to trim grass adjacent or beneath the downwardly projecting prongs or other projections of a fence wherein the guard construction is a unitary assembly, simple in construction, and foldable for easy manual arrangement for use and for rearrangement for compact storage.

Other objects and features of the invention will be apparent upon a perusal of the following specification and drawing in which:

FIGURE 1 is a view of a fence having the tool guard of the subject invention properly secured thereto;

FIGURE 2 is an enlarged cross sectional view of a portion of the structure shown in FIGURE 1 and taken substantially along the line 2—2 of FIGURE 1;

FIGURE 3 is an enlarged plan view of the subject invention in the folded position for compact storage thereof;

FIGURE 4 is a view similar to FIGURE 3 but with a number of the parts partially unfolded to shown the manner in which the invention is assembled for use from the stored condition of FIGURE 3;

FIGURE 5 is an enlarged cross sectional view of the structure shown in FIGURE 3 and taken substantially along the line 5—5 of FIGURE 3; and FIGURE 6 is an enlarged partial view of a portion of the invention shown in FIGURE 1 showing the strut locking assembly of the invention.

The present embodiment is the preferred embodiment, but it is to be understood that changes can be made in the present embodiment by one skilled in the art without departing from the spirit and scope of the present invention.

Generally, the invention is a novel tool guard construction for protecting tools such as grass trimmers when such tools are used in close proximity to the lower edge of a fence. Many types of fences have spaced apart downwardly projecting portions rather than a smooth uninterrupted surface along the lower edge thereof. A common fence of such a type is a chain-link fence. Many picket fences also have an irregular or intermittently opening lower edge. In cutting grass or other plants growing adjacent or beneath such a fence, it is very easy to accidentally engage the downwardly projecting portion of the fence with the cutting tool to thereby dull, nick or otherwise damage the cutting tool. Grass or plant cutting tools which are particularly subject to such damage are those having a blade or blades which in the cutting operation are moved in a horizontal plane. Oftentimes grass or other plants will completely obscure the lower edge of a fence and thereby present a very real hazard to a cutting tool.

The present invention which is a unique guard to prevent damage to such tools comprises a relatively long somewhat J-shaped member, a pair of struts, a coiled spring and hook assembly, and certain pin and lock constructions interconnecting the various parts. The J-shaped member is formed so that it may cover the depending prongs or projections of a length of fence to provide a continuous straight lower surface against which a horizontally moving cutting blade may be moved to prevent the cutting blade from engaging the depending prongs or projections of the covered portion of the fence. The pair of struts are pivotally connected at one end of each thereof and the other end of one of the struts is pivotally connected to the J-shaped member adjacent one end thereof. The other end of the other strut is adapted to engage a pin carried on the J-shaped member adjacent the other end thereof. The struts may be positioned in a folded condition extending longitudinally of the J-shaped member such as shown in FIGURE 3 or may be positioned to define a triangle with the J-shaped member such as shown in FIGURE 1. One end of a coiled spring is connected adjacent the pivotal interconnection of the two struts and the other end of the coiled spring carries a hook assembly. The coiled spring and hook assembly permit the J-shaped member to be temporarily secured to the lower edge of a portion of a fence by a manual placement of the hook assembly to some convenient portion of the fence. When the grass or plants adjacent to or beneath the J-shaped member have been cut or otherwise trimmed by the cutting tool therefore, the hook assembly is released from the fence, the entire guard is moved longitudinally of the fence to a new location and the hook assembly again manually engaged with another portion of the fence for further trimming of the grass or plants adjacent to or beneath the newly protected portion of the fence. When use of the guard is completed, the guard may be removed from the fence and conveniently folded into a condition such as shown in FIGURE 3 for storage. The folded struts are engageable with another pin on the J-shaped member and are conveniently locked thereto by a slight stretching of the coiled spring and engagement of the hook assembly with that pin.

In detail, the member 10 is a longitudinally extending channel member which is somewhat J-shaped in cross section as may be seen in FIGURES 2 and 5. The member 10 may be of any convenient length and may be formed of any suitable material rendering the member 10 sufficiently stable and rigid for its intended purposes. In one reduction to practice of the invention the member 10 was formed of a relatively thin aluminum material, the two longitudinal edges of which had been folded in the manner shown in FIGURE 5. The member 10 may also be formed of a relatively light gauge steel material or a relatively rigid plastic material. In one reduction to practice of the invention it was found that a convenient length for the member 10 was approximately six feet. For some applications it may be found convenient to make the member 10 of a length sufficient to span the incremental length of a fence between two of the fence posts thereof. The member 10 may further be formed with the upper corners thereof rounded as shown in FIGURES 3 and 4, and the ends of the member 10 may also be provided with holes such as holes 11 for convenient hanging of the invention during storage thereof. The member 10 may also be painted a bright color for easy observation thereof in high grass or other plants. The channel shape of the lower longitudinal portion of the member 10 permits the member 10 to effectively cover the depending prongs or projections 12 of a fence such as fence 13 shown in FIGURES 1 and 2. As may be seen in FIGURES 1 and 2, the fence 13 borders or is carried over grass or plants 14. The fence 13 which is shown by way of example only, comprises an end post 15, a gate 16, a horizontal top member 17, and the main fence surface comprising a stretched chain-link grid having depending prongs 12 positioned in a spaced apart relationship to each other along the lower edge of the fence.

The invention further comprises two struts 20 and 21. Each of the struts 20 and 21 is substantially shorter than the length of the member 10, and may be formed of a material such as aluminum or steel. One end of strut 20 is pivotally connected adjacent one end of strut 21 by a pin 22. The other end of strut 21 is pivotally connected to the member 10 at a point spaced from one end thereof by a pin 23. The end of strut 21 adjacent pin 22 is disposed at an angle to the longitudinal axis of strut 21. That end portion of strut 21 is designated 21a. A coiled spring 24 is further provided, and one end of the coiled spring 24 is connected to the end portion 21a of the strut 21 by a link 25. A hook assembly 26 comprising a pair of oppositely-facing hook portions is connected to the other end of the coiled spring 24. The two hook portions of the hook assembly 26 are provided so that one hook portion may be manually grasped to apply or otherwise engage the other hook portion to a fence such as shown in FIGURE 1.

The other end of the strut 20 is provided with a hole therethrough which may be applied over a pin 27 which is shown in enlarged detail in FIGURE 6. The pin 27 is secured to the member 10 at a point spaced from the end thereof opposite to that carrying the pin 23. The end of the strut 20 having the hole which is insertable over the pin 27 is further provided with a lock member 28. One end of the lock member 28 is pivotally connected to the strut 20 by a pin 30. The other end of the lock member 28 is provided with a notch. The pin 27 is provided with an annular groove into which the notched end of the lock member 28 may be positioned when the extending end of the strut 20 is inserted over the pin 27, such as shown in FIGURE 6, to thereby lock the extending end of the strut 20 to the pin 27 on the member 10. When the extending end of the strut 20 is locked to the pin 27, the struts 20 and 21 and the intermediate portion of the member 10 will define a triangle. In that assembled condition, the apparatus may be applied to a fence such as fence 13 as shown in FIGURE 1, by hooking the member 10 over the depending projections 12 of the fence, as is shown in FIGURE 2. By grasping one of the hook portions of the hook assembly 26, the coiled spring 24 may be partially stretched and the other hook portion caused to engage some convenient portion of the fence to thereby firmly secure the guard with the member 10 covering a certain portion of the lower edge of the fence. The grass or plants beneath or adjacent to the member 10 may then be readily trimmed or otherwise cut with no danger of the cutting tool engaging the lower edge of the fence. Upon completion of the cutting operation, the hook assembly 26 may be released from the fence and the member 10 moved lengthwise of the fence to cover the next succeeding lower edge of the fence. The guard may then again be firmly secured to the fence by the hook assembly 26. The foregoing steps may be repeated as necessary until the grass or plants adjacent or beneath the entire fence have been trimmed or otherwise cut.

FIGURE 3 shows the storage condition for the invention. When the extending end of the strut 20 is freed from the pin 27, the strut 20 may be pivoted over strut 21. Struts 20 and 21 may then be pivoted to lie against the member 10 such as shown in FIGURE 3. The member 10 is provided with a pin 31 which is positioned between the pins 27 and 23. The struts 20 and 21 are provided with aligned holes which permit the struts 20 and 21 in the folded condition to be applied over the end of the pin 31, such as is particularly shown in FIGURE 5. The extending end of the pin 31 is provided with an annular groove which is exposed when the struts 20 and 21 are applied over the pin 31. The annular groove in the pin 31 will admit one of the hook portions of the hook assembly 26 to thereby lock the struts 20 and 21 and the free end of the coiled spring 24 to the member 10 in the compact condition shown in FIGURE 3.

FIGURE 4 shows an intermediate condition of the guard in being arranged from the storage condition of FIGURE 3 to the opened condition of FIGURE 1. After the hook assembly 26 is removed from the pin 31, the struts 20 and 21 may be released from the pin 31, and by moving the strut 20 in a clockwise direction and the strut 21 in a counterclockwise direction as shown in FIGURE 4, the extending end of the strut 20 may be attached and locked to the pin 27.

Having described the invention what is considered new and desired to be protected by Letters Patent is:

1. A tool guard for preventing a cutting tool from engaging the depending projections of a fence comprising, a member formed to have an upwardly-opening generally V-shaped channel extending along the lower longitudinal edge thereof to effectively shield a series of depending projections of a fence when applied thereto, a pair of struts, means interconnecting said struts and said member above said V-shaped channel and means connecting the other ends of said struts so that said struts and said member define a triangle with the interconnection of said ends of said struts being the apex of said triangle, and means connected to said struts at said apex and adapted to be engageable with a fence at a position above the depending projections thereof.

2. A tool guard for preventing a cutting tool from engaging the depending projections of a fance comprising, a channel member formd to effectively shield a series of depending projections of a fence when applied thereto, a pair of struts, means interconnecting said struts and said channel members so that said struts and said channel members define a triangle with the interconnection of said struts being the apex of said triangle, and means connected to said struts at said apex and adapted to be engageable with a fence at a position above the depending projections thereof, said means interconnecting said struts and said channel member being formed so that said struts are manually adjustable to a position within the confines of the longitudinal edges of said channel member for compact storage of said tool guard.

3. In a tool guard as defined in claim 2, wherein said means connected to said struts at said apex is formed to provide a locking arrangement for securing said struts to said channel member in the adjusted position of said struts within the confines of the longitudinal edges of said channel member.

4. A tool guard for preventing a cutting tool from engaging the depending projections of a fence comprising, a member having one longitudinal edge thereof bent upwardly to define a generally V-shaped channel effectively receiving therein and covering a series of depending projections of a fence when applied thereto, a pair of struts, means interconnecting said struts and said member above said V-shaped channel and means connecting the other ends of said struts so that said struts and said member define a triangle with the interconnection of said ends of said struts being the apex of said triangle, and a spring and hook assembly connected to said struts at said apex and adapted to be engageable with a fence at a position above the depending projections thereof.

5. A tool guard for preventing a cutting tool from engaging the depending projections of a fence comprising, a channel member formed to effectively shield a series of depending projections of a fence when applied thereto, a pair of struts, means pivotally interconnecting said struts substantially at one end of each thereof, means pivotally connecting the other end of one of said struts to said channel member adjacent one end thereof, pin means for connecting the other end of the other of said struts to said channel member adjacent the other end of said channel member so that said struts and said channel member between the connections of said struts to said channel member define a triangle with the interconnection of said struts being the apex of said triangle, and means connected to said struts at said apex and adapted to be engageable with a fence at a position above the depending projections thereof with said channel member shielding a series of depending projections of said fence.

6. In a tool guard as defined in claim 5, wherein said pin means comprises a pin carried on said channel member and a manually operable pin lock carried on said other end of said other strut for manually locking and removing said other end of said other strut from said pin, and said pivotal connections between said struts and between said one strut and said channel member are formed so that said pair of struts are pivotable to a stacked arrangement on said channel member to extend longitudinally thereof for compact storage of said tool guard.

7. In a tool guard as defined in claim 6, a second pin carried on said channel member intermediate the ends thereof, a pair of holes formed through said struts at positions so that when said struts are stacked on said channel member said pair of holes are aligned with said second pin to permit manual application of said struts over said second pin, and wherein said means connected to said struts at said apex is formed to be manually engageable with said second pin to lock said struts in said stacked position on said channel member.

8. In a tool guard as defined in claim 5, said means connected to said struts at said apex comprising a coiled spring having one end thereof connected to said struts at said apex, a hook assembly connected to the other end of said coiled spring, said hook assembly being formed for manual engagement with a fence at a position above the depending projections thereof.

References Cited by the Examiner

UNITED STATES PATENTS 1,471,848 10/23 Johnson _____ 182—144
2,814,466 11/57 Golobay _____ 256—32

HARRISON R. MOSELEY, *Primary Examiner.*

REINALDO P. MACHADO, CHARLES E. O'CONNELL, *Examiners.*